United States Patent [19]

Miiller

[11] 4,040,847

[45] Aug. 9, 1977

[54] TEMPERATURE STABLE FIBROUS INSULATION COMPOSITION AND "WET" PACKAGE FORMED THEREOF

[75] Inventor: William Clyde Miiller, Denver, Colo.

[73] Assignee: Johns-Manville Corporation, Denver, Colo.

[21] Appl. No.: 676,776

[22] Filed: Apr. 14, 1976

[51] Int. Cl.$^2$ ............................................ C04B 35/80
[52] U.S. Cl. ....................................... 106/69; 206/525
[58] Field of Search ........................... 106/69; 206/525

[56] References Cited

U.S. PATENT DOCUMENTS

| 3,752,683 | 8/1973 | Hawthorne | 106/69 |
| 3,835,054 | 9/1974 | Olewinski et al. | 106/69 |
| 3,935,060 | 1/1976 | Blome et al. | 106/69 |

Primary Examiner—J. Poer

Attorney, Agent, or Firm—Robert M. Krone; Joseph J. Kelly; James W. McClain

[57] ABSTRACT

A novel refractory fiber thermal insulation and a "wet pack" moldable insulation package formed thereof are described. This composition comprises refractory fiber having combined therewith a binder system comprising 25% to 95% by volume of an aqueous suspension of colloidal silica having a solids content of 15 to 30 weight percent and wherein the mean particle diameter of the silica particles is not greater than 10 nm, 5% to 12% by volume ethylene glycol, and 0% to 70% by volume additional water. Wet packs using this binder composition have significantly greater strength, better thermal properties (particularly at elevated temperatures) and better adhesion to metal surfaces than commercial prior art wet packs.

7 Claims, No Drawings

4,040,847

TEMPERATURE STABLE FIBROUS INSULATION COMPOSITION AND "WET" PACKAGE FORMED THEREOF

BACKGROUND OF THE INVENTION

The invention herein relates to refractory fiber thermal insulation compositions suitable for use in water-containing packages known as "wet packs".

Refractory fiber thermal insulation blankets are normally relatively soft and resilient with virtually no ability to be self-supporting when placed in a vertical position. For certain applications, however, it is imperative that a refractory fiber composition be self-supporting, such that the finished product (for instance, a combustion chamber lining) can stand upright without external support. To this end, the prior art has impregnated blankets of fiber with various binder compositions, including various siliceous materials. The refractory fiber blanket is molded to the desired configuration and the binder is then set by heating for forming a rigid self-supporting body.

Commonly such moldable blankets have been packaged for use in the form of "wet packs". The blanket which is impregnated with an aqueous binder system is placed in an air-tight and water-tight container, such as a plastic bag. In this form the binder remains essentially unset and the moldable product can be shipped and stored relatively readily. When the customer is ready to use the product he opens the container, molds the impregnated blanket to the desired shape, and causes the binder to become set.

Certain problems have become known with the "wet pack" type of packaging, however. Because the wet pack must remain flexible and moldable until such time as the customer intends to use it, the binder system must be of a non-gelling type. However, the particles in non-gelling binders have a decided tendency to migrate to the surface of the fiber body during drying. The resultant molded product thus has binder only in the outer surface layers and as a result is substantially weaker than similar articles made from gelled binder systems where the binder is retained throughout the fiber body. In addition, during shipping and storage wet packs of fiber are often subjected to low temperatures which can cause freezing of the aqueous portion of the binder system. Such freezing of the water causes the solid binder material to precipitate out of the system and the fiber body. This also results in a substantially weakened product by the time the customer is ready to use the fiber.

One use of refractory fiber web packs is as thermal insulation for automobile turbine engines. However, it has been found quite difficult to make prior art wet pack materials adhere satisfactorily to the metal surfaces of the engine blocks. If good adhesion is not obtained, there is a decided decrease in thermal efficiency of the insulation.

OBJECTS OF THE INVENTION

It is an object of this invention to provide a wet pack system for refractory fiber thermal insulation which will be stable after being subjected to freezing.

It is also an object of this invention to provide a wet pack system for refractory fibers which minimizes migration of the binder components during drying of the final molded object.

It is further an object of this invention to provide a wet pack refractory fiber insulation which has the property of adhering strongly to metal surfaces of the type used in automobile engine turbine castings.

SUMMARY OF THE INVENTION

The fibrous insulation system of this invention comprises a refractory fiber blanket and a aqueous suspension of inorganic binder which is especially suited to be encased in a water-tight and air-tight container and subsequently removed from the container, molded to a desired configuration and caused to dry to form a solid mass of fiber bound together with set binder. The novel binder system to be used in combination with the refractory fiber comprises, in parts by volume: 25 to 95 parts of an aqueous suspension of colloidal silica having a solids content of 15 to 30 weight percent colloidal silica particles, with the mean particle diameter of the silica particles being no greater than 10 nanometers ("$nm$"); 5 to 12 parts of ethylene glycol; and 0 to 70 parts of added water. In a preferred embodiment the binder system comprises 67 parts by volume of a colloidal silica suspension containing 15 weight percent solids, 8 parts by volume ethylene glycol and 25 parts by volume of additional water. Such systems have been found to be stable after freezing and thawing and to have a significantly reduced tendency for binder migration during drying. They have also been found to adhere well to surfaces of metals of the type used in automobile engine castings.

DETAILED DESCRIPTION AND PREFERRED EMBODIMENTS

One of the principal components of the present invention is the refractory fiber blanket. The refractory fibers comprising this blanket are of various synthetic fibrous materials, such as rock wools, mineral or slag wools, ceramic fibers and the like. These are normally melts of compositions predominately of silicates of calcium, aluminum and the like di- or tri-valent metal oxides. Particularly preferred are those synthetic alumino-silicate fibers formed from melts of alumina and silica or predominately of alumina and silica with lesser amounts of added oxides, such as titania, zirconia or chromia. Typical of the latter materials are commercial refractory fibers sold by Johns-Manville Corporation under the trademarks CERAFIBER and FIBERCHROME. In a preferred embodiment the refractory fiber in the blanket is composed entirely of synthetic alumino-silicate fibers.

Throughout this specification, the fiber body is referred to as a "blanket" for it is in this form that the product finds its ultimate utility. However, it is not intended that the term "blanket" be limited to those fibrous body forms which may be sold in the market place under the designation "blanket." Rather, it is intended to include all fibrous bodies having the relatively wide, flat, elongated shape generally associated with "blankets", whether the fiber body actually is woven, matted, felted or otherwise formed into such configuration. The fibers may be taken as initially laid following fiber formation or may be compressed, needled or otherwise formed into the "blanket". Such configurations and formation techniques are well known to those skilled in the art and it is intended that all generally equivalent manufacturing techniques and specific configurations be within the scope of the present invention.

The novel component of the present invention is a binder system from which the solid component does not significantly precipitate despite freezing and thawing and does not tend to migrate to the surface of the blanket upon drying. This binder system comprises three basic components: an aqueous suspension of colloidal silica of critical particle size, ethylene glycol and water, the last comprising both that incorporated as part of the aqueous suspension of colloidal silica and in preferred embodiments also including additional water.

The aqueous suspension of colloidal silica consists essentially of silica particles dispersed in water with the solids content of the suspension being in the range of 15% to 30% by weight. It is critical to this invention that the mean particle size of the silica be no greater than 10 nm. The 10 nm limit can be considered the upper boundary of a conventional "cut" of silica particles. As such there may be some particles (less than 10%) with slightly larger sizes (up to about 1 nm greater, in most cases). This reflects the conventional commercial practice of classifying silica particle groupings as "cuts" in which about 90% or more of the particles all have sizes within about a 1 nm range. Thus, for example, there are 4–5 nm and 7–8 nm "cuts". Such cuts are within the scope of this invention, as would be a 9–10 nm "cut". However, cuts of larger particles, such as a 12–13 nm cut, are not effective in this invention, for they do not minimize the tendency of the binder to migrate. In addition, the very small particle size has been unexpectedly found to provide a product having significantly greater strength following drying than blankets bound with larger particle size silica. The aqueous suspension of colloidal silica will be present as 25% to 95% by volume of the binder system, and preferably 60% to 95% by volume. The solid silica portion of the suspension will be in the range of from 15% to 30% by weight, preferably 15% to 20% by weight of the suspension. Since the specific gravity of amorphous silica is 2.2, it can be readily calculated that this is equivalent to a silica content of 7.4% to 16.4% by volume, preferably 7.4% to 10.2% by volume of the suspension. It is also equivalent to 1.9% to 15.6% by volume, preferably 4.1% to 15.6% by volume, of the binder system as a whole. Normally in commercial from the colloidal silica suspensions will also include small amounts of additive materials generally intended to stabilize the colloidal suspension. Such additives do not affect the operation of the binder system of the present invention and may therefore be disregarded herein. For the purposes of this invention, therefore, that portion of the suspension other than the colloidal silica component can be considered to be essentially all water.

The second component of the binder system of this invention is ethylene glycol which is present in an amount of from 5% to 12% by volume, preferably 6% to 9% by volume, of the system. Suitable ethylene glycol (which has the chemical formula $C_2H_4(OH)_2$ and is alternatively known as 1,2-ethanediol) can be the normal ethylene glycol of commerce. In some cases commercial ethylene glycol is actually a mixture of ethylene glycol and water. If such a source is used for the present invention, the water portion of the commercial mixture should be calculated separately as additional water in the present system and the ethylene glycol component should be determined as pure ethylene glycol. Thus, if one used 10 volume percent of a 50—50 mixture of ethylene glycol and water into the present system, that should be accounted for as 5 volume percent of ethylene glycol and 5 volume percent of additional water.

The third component in the present system is water. The colloidal silica suspension comprises approximately 84 to 93 volume percent water based on the suspension, which equates to approximately 21.5 to 88 volume percent water based on the system. This may, in and of itself, be sufficient under for the purposes of the present composition, hence the added water portion of the component may be as low as 0%. It is preferred, however, that there be additional water and the added water may comprise as much as 70 volume percent of the system. Preferably the added water will be present as 10 to 40 volume percent of the system. The added water need not be specially treated; ordinary potable water, such as city tap water, has been found to be quite satisfactory.

Preparation of the present improved wet pack is relatively straight forward. The binder system is formed by mixing together the aqueous suspension of colloidal silica, ethylene glycol and added water. This mixture may be conveniently placed in a large vat or tank into which the refractory fiber blanket is dipped. Alternatively, the binder system may be pumped from a reservoir tank and sprayed onto the blanket. The impregnated blanket may then immediately be packaged in air- and water-tight containers, preferably plastic bags. It is more preferable, however, to first compress the blanket by passing through compression rolls to sqeeze out excess binder and accurately set the thickness of the blanket prior to packaging in the air- and water-tight containers.

It may also be desirable to incorporate into the binder system a bactericide or biocide in amounts of approximately 50 to 200 ppm to inhibit bacteria or fungus growth in the wet pack. Such incorporation may not be necessary where the pH of the system is relatively high, for high pH itself will inhibit such biological growth.

To illustrate the compositions and products of the present invention, the properties of three "wet pack" blankets were compared. The binder system of the blanket of the present invention ("Sample A") comprised 67% by volume of a commercial colloidal silica suspension containing 15 weight percent silica (sold under the number "1115" by the Nalco Chemical Company), 25% by volume potable tap water from a city water supply, and 8% by volume ethylene glycol. This binder system was used to saturate a blanket made of synthetic alumino-silicate fibers sold under the trademark CERAFIBER by Johns-Manville Corporation described above. This experimentally manufactured wet pack was compared to two commercial refractory fiber wet packs. Test Sample B was a wet pack insulation manufactured in Europe and containing a portion of unidentified organic material apparently added to inhibit binder migration. Test Sample C was a commercial wet pack manufactured in the United States. In both commercial products the binders are believed to comprise substantial portions of silica having mean particle diameters greater than 10 nm. No ethylene glycol could be detected in the samples. The test blanket of the present invention and the European blanket were both of nominal 1 inch (2.54 cm) thickness while the commercial American blanket was ½ inch (1.27 cm) thickness. The following tables illustrate the respective properties of the three samples and indicate the clear superiority of the wet pack of the present invention.

TABLE 1:
PHYSICAL PROPERTIES

| Sample | Density Wet gm/cm³ | Wet lb/ft³ | Dry gm/cm³ | Dry lb/ft³ | Solids in Binder, Wt.% |
| --- | --- | --- | --- | --- | --- |
| A | 1.11 | 69.4 | 0.271 | 16.9 | 9.46 |
| B | 1.05 | 65.6 | 0.263 | 16.4 | Approx. 10* |
| C | 0.90 | 56.2 | 0.259 | 16.2 | 9.40 |

*Experimental difficulties related to extraction of the organic component of Sample B prevented accurate determination of the solids portion of the binder. This figure thus represents a reasonable estimate of the amount of solids in the binder of Sample B.

TABLE 2:
THERMAL PROPERTIES

| Sample | Shrinkage* on Drying, % L | T | Shrinkage* on Firing, % at 982° C L | T | at 1093° C L | T | at 1204° C L | T | at 1260° C L | T | Loss on Ignition at 982° C, % |
| --- | --- | --- | --- | --- | --- | --- | --- | --- | --- | --- | --- |
| A | 0.64 | 5.1 | 1.9 | 0 | 2.6 | 4.5 | 4.4 | 5.2 | 4.7 | 6.0 | 3.3 |
| B | 0.38 | 4.2 | 1.7 | 0 | 3.4 | 4.4 | 6.0 | 9.4 | 6.6 | 9.9 | 5.4 |
| C | 0.58 | 7.7 | 2.3 | 3.5 | 2.9 | 10.7 | 4.8 | 16.0 | 4.8 | 14.8 | 1.5 |

*Shrinkage measurements are for length ("L") and thickness ("T") of the blanket.

TABLE 3:
MODULUS OF RUPTURE

| | Dry | | | | After 24 Hours Firing | | | | | | | |
| --- | --- | --- | --- | --- | --- | --- | --- | --- | --- | --- | --- | --- |
| | Without Freeze | | After Freeze | | at 983° C | | at 1093° C | | at 1204° C | | at 1260° C | |
| Sample | N/cm² | psi | N/cm² | psi | N/cm² | psi | N/cm² | psi | N/cm² | psi | N/cm² | psi |
| A | 80 | 117 | 64 | 93 | 37 | 53 | 46 | 66 | 79 | 115 | 51 | 75 |
| B | 68 | 99 | 40 | 58 | 73 | 106 | 60 | 87 | 59 | 85 | 58 | 85 |
| C | 17 | 25 | 19 | 27 | 27 | 39 | 32 | 47 | 39 | 50 | 50 | 72 |

It will be immediately evident from the data of Table 2 that the wet pack of the present invention had substantially less shrinkage and greater strength than the commercial American wet pack (Sample C) over the entire range of properties examined. In addition, the thermal properties of the wet pack of the present invention were generally better than those of the commercial European wet pack (Sample B), particularly after firing of the material at temperatures in excess of about 1100° C. It will be noted that shrinkage of the European material at the elevated temperatures was often half again as great as that of the present material.

The freeze-thaw properties are illustrated in Table 3. It will be immediately apparent that the present wet pack suffered only a 20% decrease in strength as measured in terms of modulus of rupture. The European wet pack (Sample B) suffered greater than a 40% decrease in strength. (The commercial American wet pack (Sample C) appears to have had a slight increase in strength, but the overall strength of this material was so much lower than that of either of the other two materials that comparison on the basis of freeze-thaw properties is meaningless.)

It will thus be seen that the material of this invention exhibits much better thermal properties, particularly at elevated temperatures, than the commercial materials of the prior art. In addition, it is relatively little affected by freezing and thawing, thus indicating a much greater temperature environment stability for storage and shipping.

To test the adhesion properties of the fiber insulation, exemplary wet pack compositions of the present invention were applied to samples of metal castings of the type used in automobile turbine engines and caused to dry. Later attempts to separate the metal and insulation showed that they were adhered so tightly that the insulation could not be removed without tearing it.

A further example of the superiority of the compositions of this invention is shown in Table 4, below. Laboratory samples of three materials were formed using blankets of one inch (2.5 cm) thick refractory fiber, the fiber being the aforesaid commercial alumino-silicate fiber sold under the trademark CERAFIBER. Sample D contained a binder system made up of 9.5 weight percent silica solids of 4 nm mean particle size and 8 weight percent ethylene glycol (i.e., the system of this invention). Sample E was identical except the mean particle size of the silica was 15 nm. Sample F was identical to Sample E except that it contained no ethylene glycol. The physical properties of these three samples are given below.

TABLE 4:
PHYSICAL PROPERTIES

| | Modulus of Rupture | | | | | | Dry Density | |
| --- | --- | --- | --- | --- | --- | --- | --- | --- |
| | Dry Without Freeze | | Dry After Freeze | | After 24 Hours Firing at 1093° C | | | |
| Sample | N/cm² | psi | N/cm² | psi | N/cm² | psi | gm/cm³ | lb/ft³ |
| D | 80 | 117 | 64 | 94 | 46 | 66 | 0.27 | 16.9 |
| E | 47 | 69 | 56 | 82 | 58 | 85 | 0.25 | 15.6 |
| F | 27 | 39 | 22 | 32 | 19 | 28 | 0.25 | 15.6 |

The wet pack insulation package of the present invention will comprise the above described insulation composition encased in an air- and water-tight container, which preferably is a flexible plastic bag. Other containers may also be used, such as kraft paper bags or boxes sealed with suitable coating materials, metal foil containers, and so forth.

What I claim is:

1. A temperature stable refractory fiber insulation composition which comprises a binder impregnated refractory fiber blanket, said binder comprising a binder system consisting essentially of 25% to 95% by volume of an aqueous suspension of colloidal silica containing 15 to 30 weight percent solids, wherein the silica is in the form of particles having a mean particle diameter of not greater than 10 nanometers; 5 to 12 volume percent ethylene glycol; and up to 70% added water.

2. The composition of claim 1 wherein said binder system comprises 60 to 95 volume percent of said aqueous suspension of colloidal silica, 5 to 12 volume percent of ethylene glycol, and 1 to 35 volume percent of added water.

3. The composition of claim 1 wherein said silica is in the form of particles having a mean particle diameter of not greater than 6 nanometers.

4. The composition of claim 1 wherein the solids content of said aqueous suspension of colloidal silica is in the range of from 15 to 20 weight percent.

5. The composition of claim 1 consisting essentially of 67% by volume of an aqueous suspension of colloidal silica containing a solids content of 15% and wherein the silica is in the form of particles having a mean particle diameter not greater than 6 nanometers; 8% by volume ethylene glycol; and 25% by volume added water.

6. A wet pack insulation package which comprises the insulation composition of claim 1 sealed in an airtight and water-tight container.

7. The package of claim 6 wherein said container comprises a flexible plastic bag.